United States Patent
Rossum

[19]

[11] Patent Number: 6,092,126
[45] Date of Patent: Jul. 18, 2000

[54] ASYNCHRONOUS SAMPLE RATE TRACKER WITH MULTIPLE TRACKING MODES

[75] Inventor: David P. Rossum, Monterey, Calif.

[73] Assignee: Creative Technology, Ltd., Singapore, Singapore

[21] Appl. No.: 08/969,312

[22] Filed: Nov. 13, 1997

[51] Int. Cl.[7] .................................................. G06F 13/00
[52] U.S. Cl. ............................... 710/52; 710/56; 710/57; 711/150; 711/168
[58] Field of Search ................................... 710/52–57, 65, 710/69, 70–72; 364/718–719, 720–721, 724.01, 724.1; 711/150, 168, 127, 154

[56] References Cited

U.S. PATENT DOCUMENTS

| | | | |
|---|---|---|---|
| 5,376,752 | 12/1994 | Limberis et al. | 84/622 |
| 5,666,299 | 9/1997 | Adams et al. | 364/724.011 |
| 5,748,120 | 5/1998 | Yasuda | 341/61 |
| 5,812,336 | 9/1998 | Spurbeck et al. | 360/51 |
| 5,818,888 | 10/1998 | Holmqvist | 375/355 |
| 5,892,694 | 4/1999 | Ott | 364/724.1 |
| 5,903,232 | 5/1999 | Zarubinsky et al. | 341/61 |

OTHER PUBLICATIONS

Limberis, Alex et al., An Architecture for a . . . Dynamic Voice Allocation, Oct. 7–10, 1993, AES 95th Convention, New York.

Julius O. Smith et al., "A Flexible Sampling–Rate Conversion Method," IEEE International Conference On Acoustics, Speech, and Signal Processing, Mar. 1984, cover plus 19.4.1–19.4.4.

*Primary Examiner*—Ayaz R. Sheikh
*Assistant Examiner*—Raymond N Phan
*Attorney, Agent, or Firm*—Townsend & Townsend & Crew LLP

[57] ABSTRACT

An asynchronous sample rate tracker with rapid acquisition and good steady state performance is provided. In one embodiment, dual tracking loops are used to control reading from a FIFO sample buffer and generation of a ratio of source and local sampling rates. One tracking loop is used for rapid acquisition when the buffer is either empty or full with another tracking loop being used for steady-state operation. The steady-state tracking loop incorporates a low-pass filter to remove the effects of momentary variations in source sampling rates.

36 Claims, 5 Drawing Sheets

ASYNCHRONOUS SAMPLE RATE TRACKER WITH MULTIPLE TRACKING MODES

STATEMENT OF RELATED APPLICATIONS

The present application is related to the subject matter of a co-filed and co-assigned application entitled ASYNCHRONOUS SAMPLE RATE TRACKER, U.S. Ser. No. 09/084,154, filed May 20, 1988.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

SOURCE CODE APPENDIX

A source code appendix is included herewith.

BACKGROUND OF THE INVENTION

The present application relates to sampled data systems and more particularly to techniques for tracking the sample rate of an input data stream that is asynchronous to a locally available sampling clock.

It is well-known to represent audio signals as streams of audio samples. Well-known applications include CD players, digital music synthesis, sound effects for games, etc. Sample rates are however not standardized among all types of digital audio equipment.

Consider a situation where a personal computer sound synthesis system combines locally synthesized music and input from, e.g., a CD player. The sampling rate of the locally generated audio data and the CD player input will differ. Furthermore, the CD player output will not be synchronized at all to the local clock of the personal computer sound synthesis system. Combining the sounds generated by each will require synchronization of the input sound data to the local clock and also a resampling of the input sound samples to the local clock rate.

Performing these functions is the task of a device known as an asynchronous sample rate converter. A typical asynchronous sample rate converter may be understood as primarily consisting of two components: an asynchronous sample rate tracker, and a resampler. The tracker receives the input data samples at the source data rate and provides the input data samples to the resampler in sync with the local sampling clock. The tracker also provides the resampler with an estimated ratio of the source sample rate to the local sample rate.

Typically, the tracker controls a buffer to store input samples until they are ready to be provided to the resampler. The tracker must provide the input samples to the resampler so that the buffer does not become either full or empty. It is also desirable that the tracker rapidly acquire the ratio of sampling rates. The tracker implementation should also be simple.

SUMMARY OF THE INVENTION

By virtue of the present invention, an asynchronous sample rate tracker with rapid acquisition and good steady state performance is provided. In one embodiment, dual tracking loops are used to control reading from a FIFO sample buffer and generation of a ratio of input and local sampling rates. One tracking loop is used for rapid acquisition when the buffer is either empty or full with another tracking loop being used for steady-state operation. The steady-state tracking loop incorporates a low-pass filter to remove the effects of momentary variations in input sampling rates.

In accordance with one aspect of the present invention, in a sampled data system that receives input data samples into a FIFO memory asynchronously to a local sample clock, a method is provided for regulating output from the FIFO memory synchronous to the local sample clock. The method includes steps of: monitoring a position of a read address of the FIFO relative to a write address of the FIFO, the read address incrementing upon a read operation from the FIFO and the write address incrementing upon a write operation into the FIFO, monitoring a period between write operations into the FIFO; and performing processing operations on the monitored period to develop an estimated ratio of local sample clock rate to rate of the read operations, the processing operations depending on the monitored position.

A further understanding of the nature and advantages of the inventions herein may be realized by reference to the remaining portions of the specification and the attached drawings.

DESCRIPTION OF SPECIFIC EMBODIMENTS

The description that follows makes reference to functional diagrams depicting functional elements as common digital circuit components such as summers, arithmetic shift units, ROMs, etc. However, the present invention may be implemented in any hardware configuration, or in software. An appendix included herewith shows source code in the C language representing a software simulation of one embodiment of the present invention.

The present invention provides a method and apparatus for tracking an asynchronous sample rate, such as would be provided to an asynchronous sample rate converter. An asynchronous sample rate converter may find applications in a digital audio processor that receives audio data from another source where the processor and the source do not share a common time base. Exemplary sources include CD players, DAT players, DVD players, and web sites having audio materials.

Figure 1:
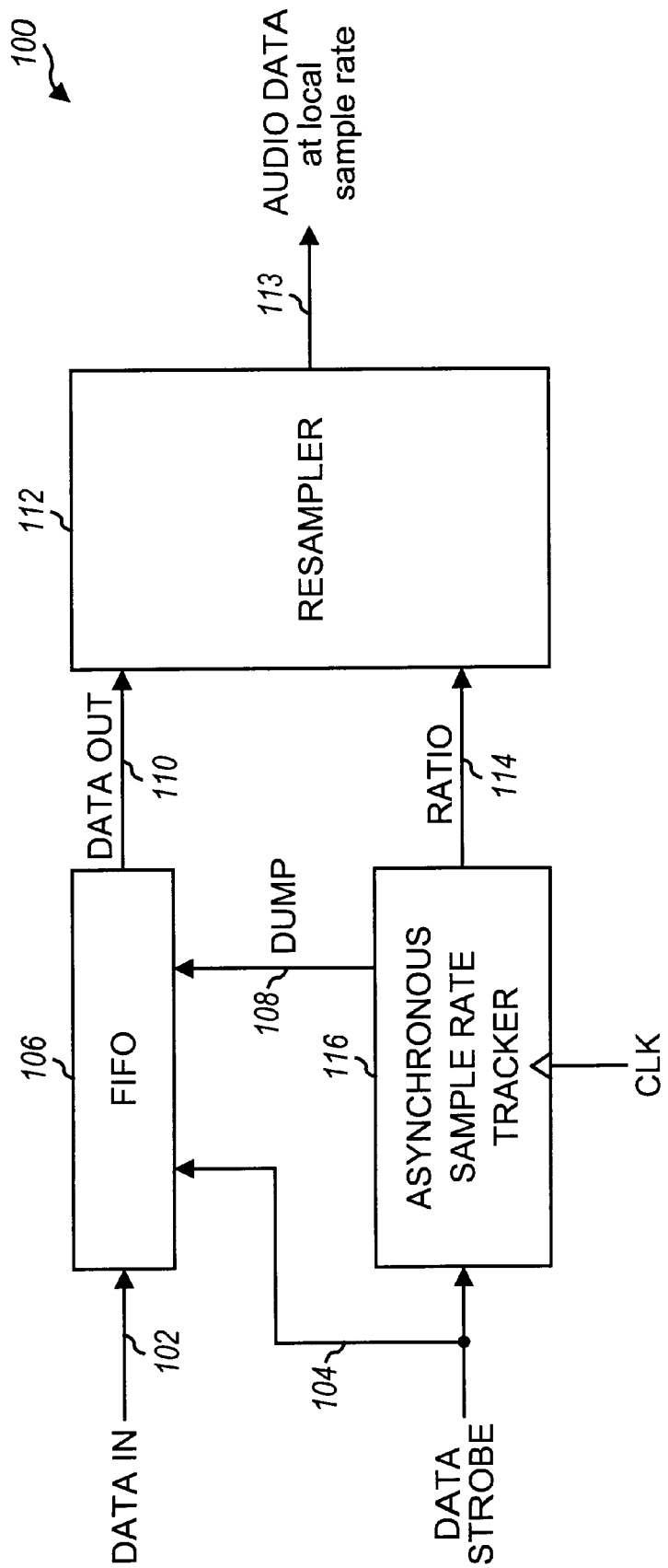
FIG. 1 depicts an asynchronous sample rate converter according to one embodiment of the present invention including a FIFO buffer.

FIG. 1 depicts an asynchronous sample rate converter 100 according to one embodiment of the present invention. Audio samples arrive via a data in line 102. A data strobe line 104 carries an indication of when the audio samples on data in line 102 are valid to be clocked in. The samples are from the source that synchronizes its transmissions to a clock independent from the clock local to the audio processing system that includes asynchronous sample rate converter 100. Herein, the rate of arrival of input samples is referred to as the source sampling rate and the clock which synchronizes the transmission of these samples is the source clock.

The source of the asynchronous samples may transmit these samples in a variety of formats. Typical formats include AES/EBU, S/PDIF, and I$^2$S, which are all serial formats. Parallel formats are also possible, although less common. Data will be received in these formats, which must be synchronized to the local clock and re-formatted into sample data 102 and data strobe 104 by techniques well known to those skilled in the art. Data Strobe 104 is asserted for a single period of the local clock.

The remainder of the discussion assumes that data in line 102 carries a single sample at a time with each sample being clocked by data strobe line 104. However, the present invention is also applicable to audio data sources which clock multiple samples with each assertion of data strobe line 104. These multiple samples can either represent sample points from several channels of audio running at identical sample rates (such as stereo audio), or a block of sequential data points from a single audio channel, or equally sized blocks from multiple audio channels running at identical rates.

A FIFO memory 106 provides buffering for input audio samples. Input audio samples are clocked into FIFO memory 106 upon assertion of data strobe line 104 and clocked out upon assertion of a dump signal 108. A data out line 110 of FIFO memory 106 is the data input to a resampler 112.

Asynchronous sample rate converter 100 forms part of an audio data processing system with a local clock and a local sample rate. In an exemplary embodiment, the local sample rate is 48 KHz and the local clock rate is 1024*48 KHz or 49.152 MHz.

In any given local sampling period, resampler 112 may read zero, one, or more than one samples from FIFO memory 106. Resampler 112 outputs a data stream 113 at the local sample rate and synchronized to the local clock. The internal operation of resampler 112 does not form a part of the present invention.

In any given local sampling period, resampler 112 may read zero, one, or more than one samples from FIFO memory 106. The read operation of resampler 112 is synchronous to the local clock. If FIFO memory 106 is to not become full or empty, a balance must be maintained between read operations from FIFO memory 106 and write operations into FIFO memory 106. Furthermore, the operation of resampler 112 also typically requires a ratio input signal 114 that indicates the ratio of source sampling rate to local sampling rate. Controlling read operations from FIFO memory 106 and generating ratio input signal 114 is the function of an asynchronous sample rate tracker 116.

Both functions of asynchronous sample rate tracker 116 are based on tracking the source sample rate. Asynchronous sample rate tracker 116 incorporates a tracking loop to acquire and track the source sample rate. According to the present invention, asynchronous sample rate tracker 116 rapidly acquires a good approximation to the source sample rate upon initiation of data transfer from the source. Asynchronous sample rate tracker 116 is also insensitive to momentary variations in the repetition rate of data strobe 104. Both characteristics are critical to the quality of the audio output of resampler 112. It will be appreciated that rapid acquisition and insensitivity to momentary variations in the repetition rate of data strobe 104 are contradictory objectives in control loop design, because the repetition rate of data strobe 104 is the sole method of determining the sample rate. Accordingly, asynchronous sample rate tracker 116 incorporates dual tracking loops, with one tracking loop for rapid acquisition and another tracking loop for good steady state performance.

Figure 2A:
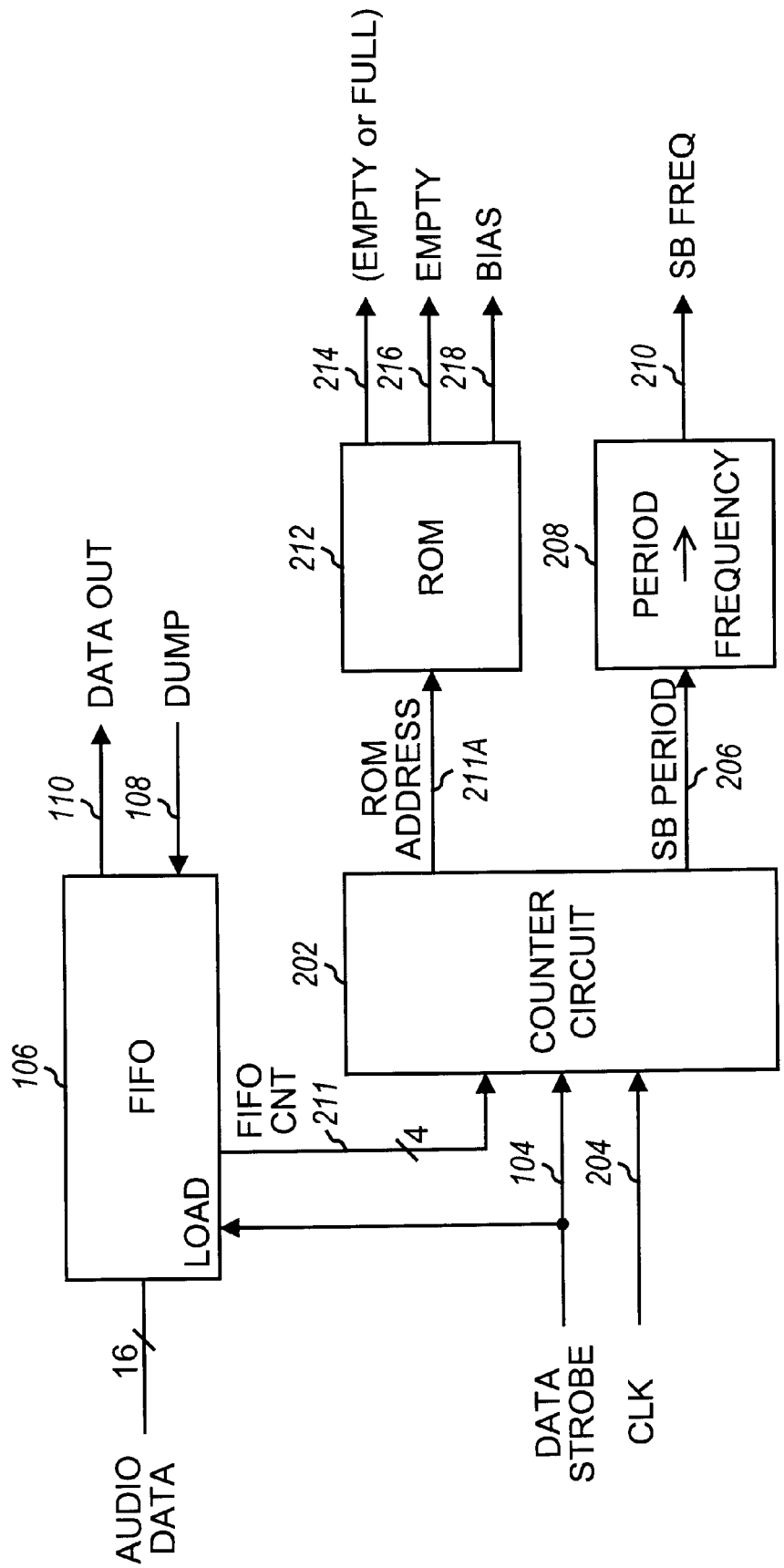
FIG. 2A is a functional diagram depicting a portion of the asynchronous sample rate converter of FIG. 1 that determines the input sample rate, input sample period, and that generates control signals responsive to a current FIFO read address relative to write address.

FIG. 2A is a functional diagram depicting a portion of the asynchronous sample rate converter of FIG. 1 that determines the approximate source sample rate, approximate source sample period, and that generates control signals responsive to a current FIFO read address relative to write address. A counter system 202 accepts data strobe line 104 and a local clock signal 204 and determines a period between assertions of data strobe line 104 as measured in local clock periods. A source period signal 206 indicates the length of the most recent period between source sample signals as a 14 bit word. Source period signal 206 is an approximation to the actual source period, accurate to within plus or minus one local clock period. The time average value of source period signal 206 is an accurate representation of the average source period over the same time.

A period to frequency converter 208 converts period signal 206 to a source frequency signal 210 indicating a measurement of source frequency. Source frequency signal 210 is preferably a 17 bit word and the conversion is accomplished by dividing $2^{26}$ by the source period. Source frequency signal 210 is similarly an approximation within limits based on the local clock period, and accurate in the average.

FIFO memory 106 may be understood as incorporating a current read address pointer and a current write address pointer. The read address pointer increments with every read operation and the write operation pointer increments with every write operation. When one of the pointers increments past the end of the available FIFO address space, it is set to zero. In order to keep read and write operations for FIFO memory 106 in balance, the read and write pointers should be kept apart from each other. If the FIFO address space is understood to be circular, asynchronous sample rate tracker 116 should seek to maintain a 180 degree phase difference between the pointers. FIFO memory 116 generates a FIFO count signal 211 that indicates the current spacing in samples between the read and write data pointers.

A latched version of FIFO count signal 111 serves as an address signal 211A to a ROM 212. ROM 212 serves as a look-up table that generates a particular pattern of control signals depending on the relative positions of the read and write address counters. An empty or full control signal 214 indicates whether the FIFO is either completely empty or completely full necessitating use of the rapid acquisition tracking loop rather than the steady state tracking loop. When empty or full control signal 214 is asserted, an empty signal 216 indicates whether the FIFO is empty or full to determine the needed direction of relative movement between the write and read address counters. A bias signal 218 varies with the relative position of the address counters.

Bias signal 218 is preferably 14 bits wide to represent values ranging from −8192 to +8191. The application and content of bias signal 218 are discussed in further detail below.

Figure 2B:
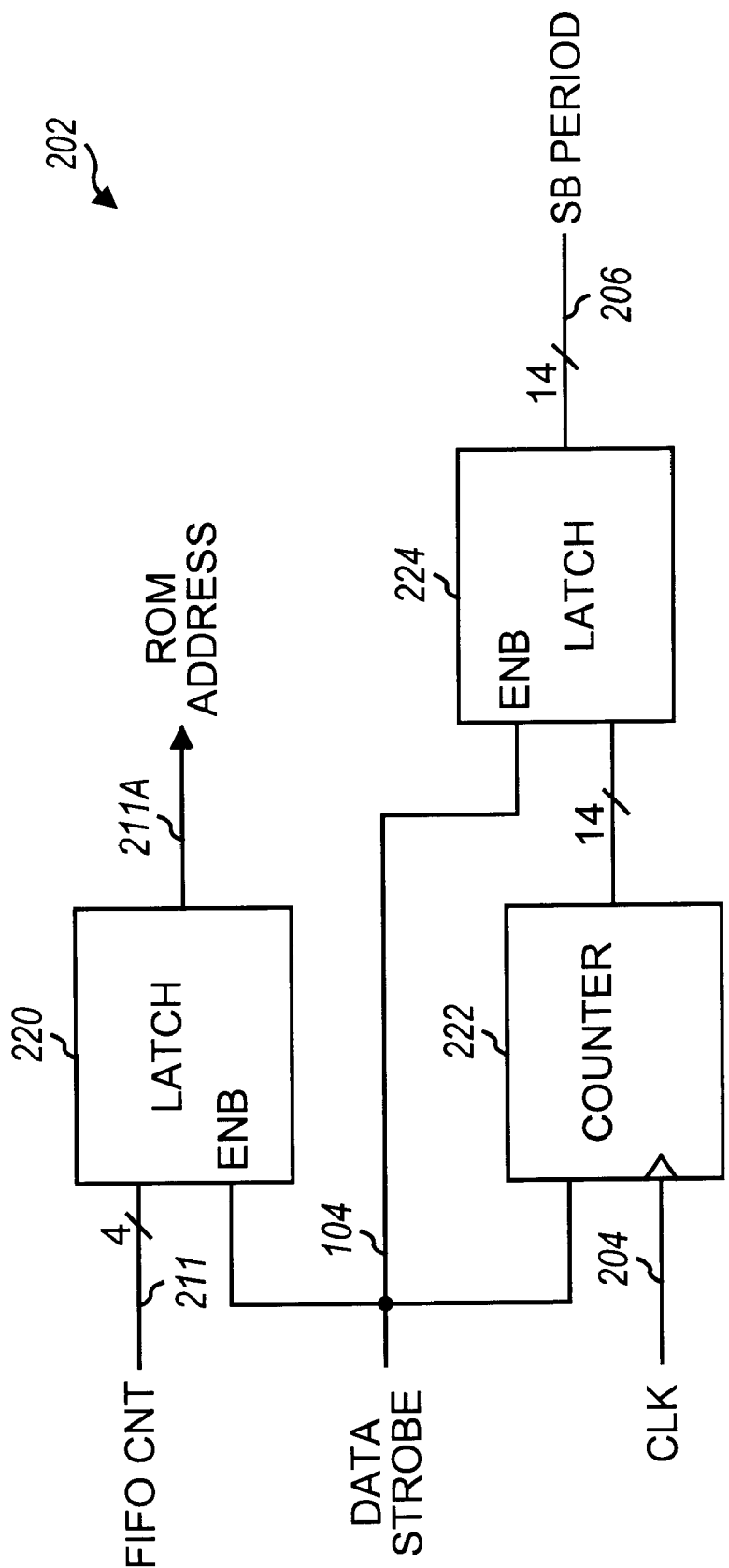
FIG. 2B is a functional diagram depicting details of a counter system for determining an input sample period and for generating address signals for a look-up table for generating control signals responsive to the current FIFO read address relative to write address.

FIG. 2B is a functional diagram depicting details of counter system 202. A latch 220 provides valid ROM address signal 211 which may change only upon each assertion of data strobe 104. A counter 222 increments at the local clock rate and resets to upon each assertion of data strobe 104. The final count value is latched by a latch 224. The output of latch 224 is a 14 bit word representing the source sample period in local clock cycles.

Figure 3:
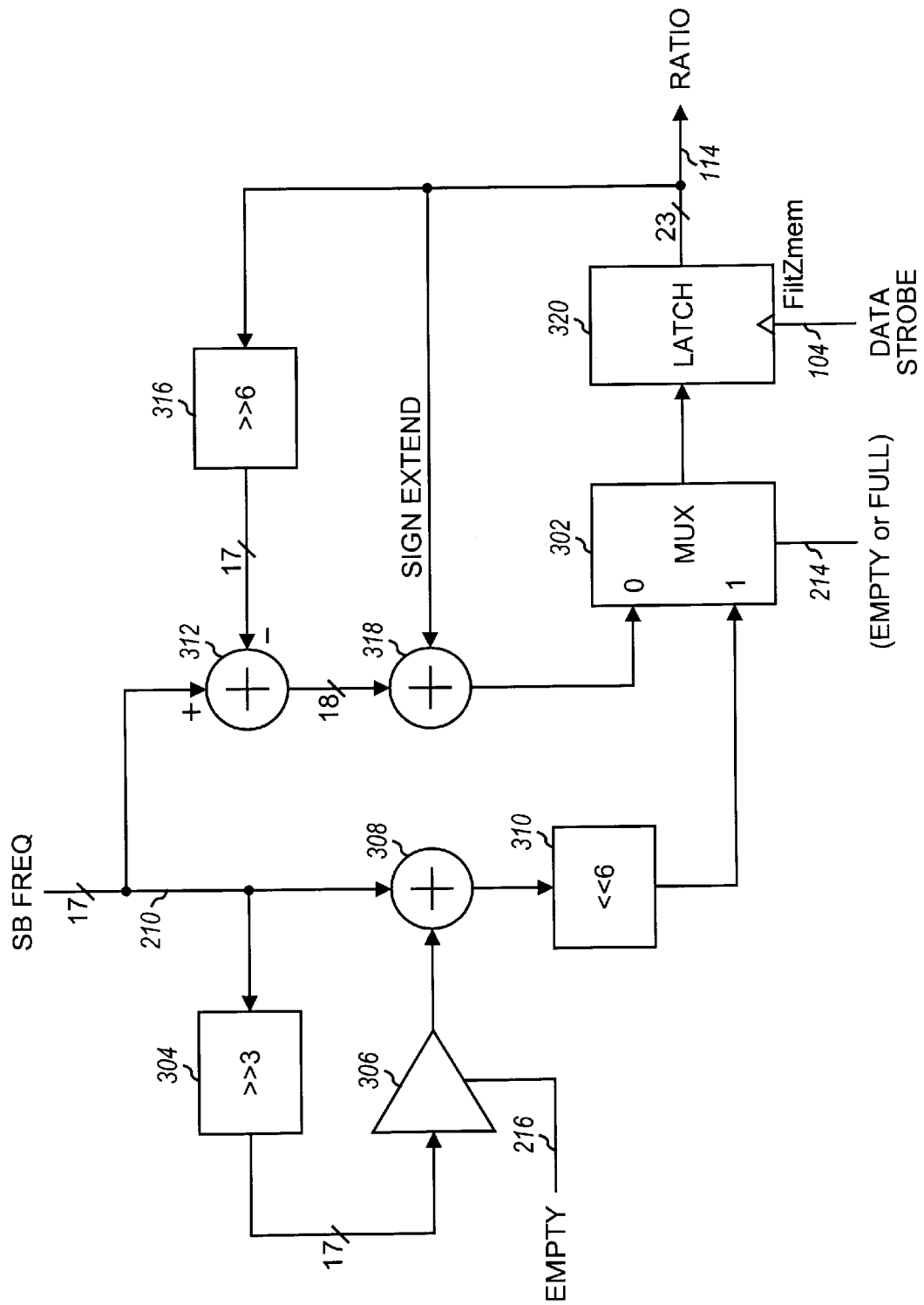
FIG. 3 is a functional diagram showing how bias and/or filtering may be applied to the input sampling frequency determined by the functional elements shown in FIGS. 2A–2B to develop a phase increment estimate.

FIG. 3 is a functional diagram showing how bias and/or filtering may be applied to the source sampling frequency determined by the functional elements shown in FIGS. 2A–2B to develop a phase increment estimate. The output of the depicted functional elements of FIG. 3 is ratio signal 114 which also represents a phase increment used to control reading from FIFO memory 106. A multiplexer 302 selects either the rapid acquisition tracking loop or the steady state tracking loop based on empty or full control signal 214. If empty or full control signal 214 is negated, the steady state tracking loop is selected. If empty or full control signal 214 is asserted, the rapid acquisition tracking loop is selected.

The rapid acquisition tracking loop adds or subtracts a pre-bias depending on whether the FIFO is actually empty or full. The effect is to force the read pointer to drift toward the middle of the address space that begins with the current value of the write pointer. An arithmetic shift right unit 304 shifts source frequency signal 210 by three bits. An inverter 306 changes the sign of the shifted source frequency signal 210 but only if empty signal 216 is asserted. A summer 308 sums the unshifted source frequency signal with the output of inverter 306. An arithmetic shift left unit 310 shifts the output of summer 308 left by six bits. The output of arithmetic shift left unit 310 is then a first one of two selectable inputs to multiplexer 302.

Note that the arithmetic shift operations in a hardware implementation simply require re-numbering of the bits entering the specified arithmetic units, and hence consume no actual gates. Similarly note that because the function of this part of the loop is always approximate, the difference between numerical two's complement negation and one's complement inversion is insignificant, therefore inverter 306 can be implemented in hardware as a bank of exclusive OR gates rather than an arithmetic two's complementer.

The steady state tracking loop includes a lowpass filter. A subtractor 312 subtracts a right-shifted version of ratio signal 114 from source frequency signal 210. Note that this is now a signed, two's complement, 18 bit number. Ratio signal 114 is itself output by latch 320 labeled "FiltZMem." A summer 318 adds the sign extended output of subtractor 312. The output of summer 318 serves as the steady state input to multiplexer 302. The output of multiplexer 302 is clocked into latch 320. The output of latch 320 is ratio signal 114. Ratio signal 114 is subject to a six bit shift to the right by an arithmetic shift right unit 316. It will be appreciated that including multiplexer 302 in the feedback path for the lowpass filter assures that the steady state tracking loop will correctly initialize when operation switches to that loop from the rapid acquisition loop.

The circuitry described above implements a first order recursive lowpass filter according to the equation:

$$Y_n = Y_{n-1} + 2^{-k}(X_n - Y_{n-1})$$

where Yn represents the output of the filter which is the output of multiplexer 302, $Y_{n-1}$ is the previous output of the filter which is ratio signal 114, Xn the input to the filter which is source frequency signal 210, and $2^{-k}$ is the filter coefficient which is determined by shift right unit 316 and the sign extension of the output of subtractor 312.

Arithmetic shift left unit 310 shifts left by 6 to match the rapid acquisition tracking loop scale to that of steady state tracking loop since an arithmetic shift right of 6 is applied within both loops by arithmetic shift right unit 316. The value of k=6 is chosen as a filter coefficient to determine the degree of attenuation of jitter on source frequency signal 210, which must be compromised against the response time of the steady state tracking loop. A value of K=6 empirically exhibits good audible performance of typical audio signals with respect to both parameters.

Subtractor 312 operates with 17 bits of precision while the output of latch 320 has 17+k=23 bits of precision, due to the selection of k=6 for the number of bits of shift. Thus it can be appreciated that the incorporation of arithmetic shift right unit 316 signifies that the 17 most significant bits of the output of latch 320 are selected for input to inverter 314 rather than an explicit shift to the right.

The pre-bias factor applied by the arithmetic shift right unit 304 causes the transition from the rapid acquisition loop to the steady state loop to also cause the FIFO pointers to tend towards a point 180 degrees apart when the transition is complete. This occurs when the pre-bias shift factor is chosen to be k−log$_2$ (FIFO size)+1. In the depicted embodiment, the FIFO holds sixteen samples and k=6 leading to the pre-bias factor of 3.

Figure 4:
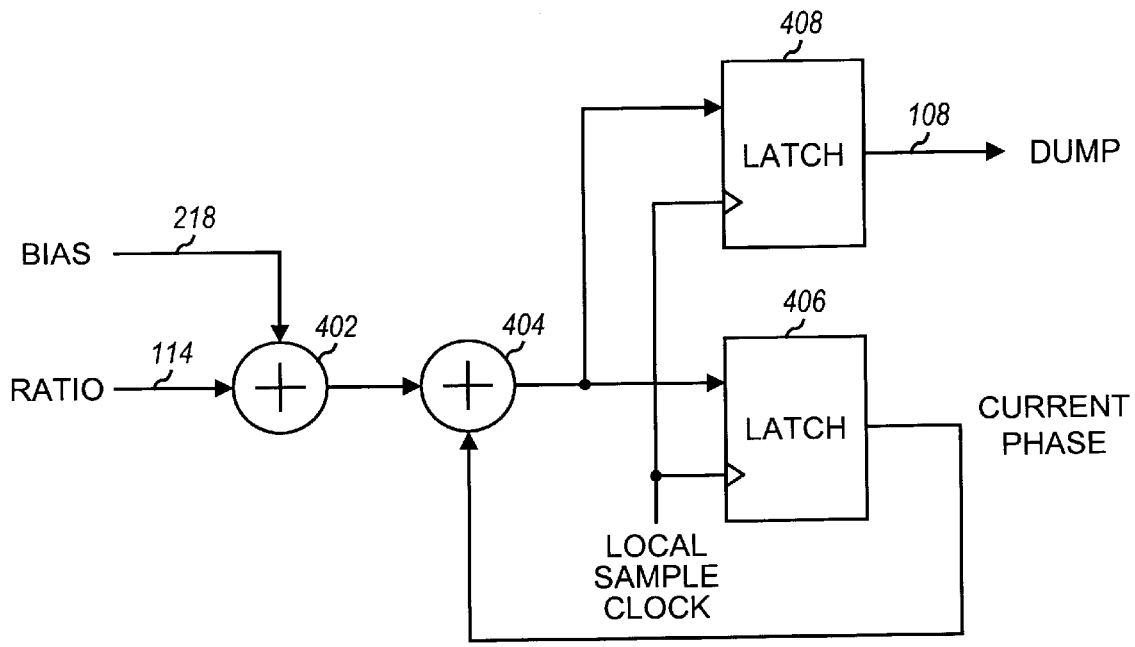
FIG. 4 is a functional diagram showing generation of a FIFO read signal based on the phase increment estimate determined by the functional elements of FIG. 3.

FIG. 4 is a functional diagram showing generation of a FIFO read signal based on the phase increment estimate determined by the functional elements of FIG. 3 and the bias value given by ROM 212. A summer 402 adds bias signal 218 to ratio signal 114. Bias signal 218 depends on the relative position of the read and write address counters of FIFO 106. For a 16 sample FIFO with scaling as shown in FIGS. 1–4, the values are preferably as follows:

| Write Address-Read Address | Bias |
|---|---|
| 0 | −4096 |
| 1 | −1024 |
| 2 | −256 |
| 3 | −64 |
| 4 | −16 |
| 5 | −4 |
| 6 | −1 |
| 7 | 0 |
| 8 | 0 |
| 9 | 0 |
| 10 | 1 |
| 11 | 4 |
| 12 | 16 |
| 13 | 64 |
| 14 | 256 |
| 15 | 1024 |
| 16 | 4096 |

The bias values are selected so as to accelerate movement to the FIFO center position, corresponding in the example to a difference of approximately 8 samples between the write and read address pointers while avoiding excessive overshoot. The values in the table are based on experiment and appear to work well for typical audio signals.

A summer 404 acts as a phase accumulator, adding the output of summer 402 to a latched accumulated phase. A latch 406 latches the accumulated phase provided by summer 404 and is clocked at the local sampling rate. The integer portion of the accumulated phase provided by summer 404 indicates the number of pulses to be read from FIFO 106. A latch 408 latches an integer portion of the accumulated phase. Dump signal 108 indicates the number of reads. The dump signal 108 is added to the read address once each local sample rate period, thus dumping zero, one, or more than one sample. The log to the base 2 of the maximum possible ratio of input to output sample rates, rounded up to the next higher integer value, is the required width in bits of dump signal 108. This maximum ratio also determines the maximum number of samples which can be dumped in a single period. In the case of the preferred design, this ratio is slightly less than 2. Thus depending on the result of the most recent addition by summer 404, zero, one, or more than one sample may be read from FIFO 106 during each local sampling period. With each read operation, the read pointer increments, thus closing the tracking loop.

Figure 5:
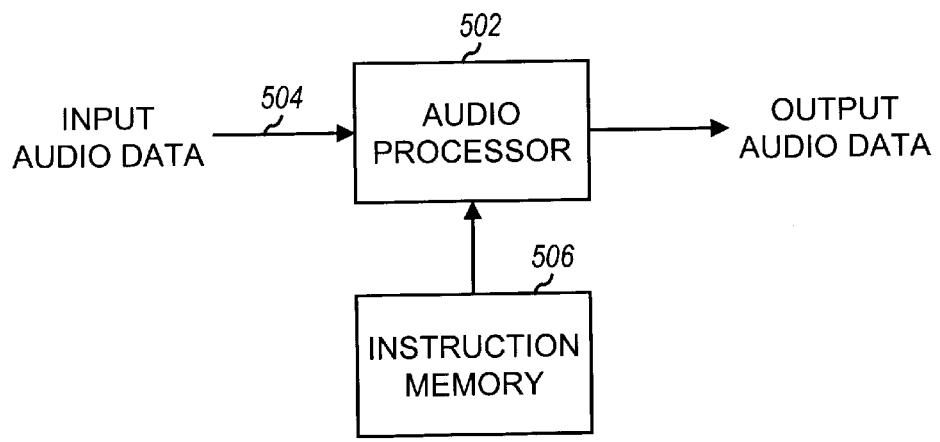
FIG. 5 depicts a software-based audio processing system usable to implement the present invention.

FIG. 5 depicts a software-based audio processing system usable to implement the present invention. Audio data comes into an audio processor 502 on an audio data line 504. Audio processor 502 may be caused to perform any or all of the functions of asynchronous sample rate tracker 100 by instructions stored in instruction memory 506. Instruction memory 506 may be any computer-readable storage medium such as ROM, RAM, magnetic storage medium, optical storage medium etc, floppy disk, CD-ROM, DVD-ROM, etc.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents. For example, other multiplication and division operations may substitute for the arithmetic shift right and shift left operations described above.

Attorney Docket No. 017002-009100US
SOURCE CODE APPENDIX

DUAL LOOP ASYNCHRONOUS SAMPLE RATE TRACKER

Copyright (c) 1996
E-mu Systems Proprietary All rights Reserved.

```
/*******************************************************************
* Simulation of Asynchronous Sample Rate Converter Pitch Extractor
* Copyright 1996 by Creative Technology, Ltd. All Right Reserved

*******************************************************************/
#define FIFOMIN 1
#define FIFOMAX 14
define FILTERK 6 include <stdio.h>
main(argc,argv)
int argc;
char *argv[ ];
{
    static int fifoRom[ ] = {-4096,-1024,-256,-64,-16,-4,
                                    -1,0,0,0,1,4,16,64,256,1024,4096};
    int
    clkCount = 0x100000,
    sctr = 0,
    sbValid = 0,
    sbPeriod = 0,
    sbPeriodCtr = 0,
    sbFreq = 0,
    fifoCnt = 8,
    fifoLatch = 8,
    filtZmem = 0,
    phaseIncr = 0,
    phase = 0;
    float fsbFreq = 44100.1, sbPhase, estFreq;

/*******************************************************************
* process input command line arguments
*******************************************************************/ while (--argc > 0 && (*++argv)[O] =='-')
    {
        switch ((*argv) [1])
        {
            case 's': /* set soundBlaster initial rate */
                sscanf( (&((*argv) [2])),"%f",&fsbFreq);
                fprintf(stderr,"sbFreq = %f\n",fsbFreq);
                break;
            case 'f': /* start with phase increment fast */
                    filtZmem = 0xffffff;
                    phaseIncr = 0xffff;
                break;
            case 'c': /* set number of clocks to run */
                sscanf( (&((*argv) [2])), "%d",&clkCount);
                break;
            case 'h': /* help */
                usage ( );
```

-continued

```
                break;
        }
    }
/*******************************************************************
********************************************************************/
while (clkCount-- > sctr = (sctr+1) & 0x3ff;      /* SCTR counts 1024 samples */ sbPhase += fSbFreq/(48000.0*1024);    /* Create async input */
    if (sbPhase > 1.0) {
        sbPhase -= 1.0;
        sbValid = 1;
    } else {
        sbValid = 0;
    }
    if (sbValid) { /* Data Strobe is asserted this SCTR period */
        sbPeriod = sbPeriodCtr; /* Measure period in clocks */
        sbPeriodCtr = 1;
        sbFreq = 0x4000000/sbPeriod; /* Calculate approx freq */ if (fifoCnt >= FIFOMAX) {
            phaseIncr = sbFreq + (sbFreq >> (FILTERK-3));
            filtZmem = phaseIncr << FILTERK;
        } else if (fifoCnt <= FIFOMIN) {
            phaseIncr = sbFreq - (sbFreq >> (FILTERK-3));
            filtZmem = phaseIncr << FILTERK;
        } else {
            filtZmem = filtzmem + (sbFreq - phaseIncr);
            phaseIncr = filtZmem>>FILTERK;
        } fifoLatch = fifoRom(fifoCnt);

fifoCnt++; /* Simulate FIFO load of this sample */
        if (fifoCnt >
            fifoCnt = 16;
            fprintf(stderr, "FIF0 overflow\n");
        } estFreq = (float)phaseIncr*48000.0/65536.0;
        printf("%03x %5.0f %5.0f ",
            sctr, fSbFreq,estFreq);

} else {
        sbPeriodCtr++;
    } if (sctr == 0x3ff) {   /* At 48 kHz rate   */
        phase += phaseIncr + fifoLatch;    /*   Create the output oscillator */
        if (phase > 0x10000) {
            fifoCnt -= (phase>>16); /* Simulate FIFO dump */
            if (fifoCnt < 0) {
                fifoCnt = 0;
                fprintf(stderr, "FIFO underflow\n");
            }
            phase = phase & 0xffff;
        }
    }
}
}

/*******************************************************************
********************************************************************/
usage( )
{
        /* print usage for program */
fprintf(stderr,"%s%s%s%s%s",
"usage:  asyncconv      [-cCLOCKCOUNT -sINFREQ -f -h]\n",
"       -cCLOCKCOUNT:       Run for CLOCKCOUNT c49M clocks (0x100000).\n",
"       -sINFREQ:           Set input frequency to INFREQ (44.1001kHz).\n",
"       -f:                 Starts with phase incr at 48K (dflt is 0).\n",
"       -h                  Prints this message.\n");
exit(0);
}
```

What is claimed is:

1. In a sampled data system that receives input data samples into a FIFO memory at a source sample rate asynchronous to a local clock, a method for controlling output from said FIFO memory synchronous to said local clock, the method comprising:

monitoring a position of a current read address of said FIFO memory relative to a current write address of said FIFO memory, wherein said read address is advanced in a particular direction upon a read operation from said FIFO memory and said write address is advanced in said particular direction upon a write operation into said FIFO memory;

monitoring a period between write operations into said FIFO memory; and processing said monitored period to develop an estimated ratio of a local sample rate to a rate of said write operations, said processing including performing a particular one of a plurality of sets of operations, wherein each of said plurality of sets of operations corresponds to a respective one of a plurality of tracking modes and said particular set of operations is selected based, in part, on said monitored position.

2. The method of claim 1, wherein said plurality of tracking modes includes a first tracking mode having a first response and a second tracking mode having a second response, said first response being faster than said second response.

3. The method of claim 2, wherein said first tracking mode is selected when said monitored position indicates said FIFO memory is approximately full or empty.

4. The method of claim 2, further comprising:

biasing said estimated ratio by a bias amount to accelerate movement of said monitored position toward a center of said FIFO memory between empty and full.

5. The method of claim 3, wherein said set of operations corresponding to said first tracking mode include pre-biasing said estimated ratio to accelerate movement of said monitored position toward a center position between full and empty.

6. The method of claim 3, wherein said set of operations corresponding to said second tracking mode include filtering said estimated ratio.

7. The method of claim 4, wherein said bias amount is based, in part, on said monitored position.

8. The method of claim 6, wherein said filtering is achieved with a first order lowpass filter.

9. In a sampled data system that receives input data samples into a FIFO memory at a source sample rate asynchronous to a local clock, a method for controlling output from said FIFO memory synchronous to said local clock, the method comprising:

monitoring a position of a current read address of said FIFO memory relative to a current write address of said FIFO memory, wherein said read address is advanced in a particular direction upon a read operation from said FIFO memory and said write address is advanced in said particular direction upon a write operation into said FIFO memory;

monitoring a period between write operations into said FIFO memory;

processing said monitored period to develop an estimated ratio of a local sample rate to a rate of said write operations, said processing includes performing a set of operations selected depending on said monitored position;

accumulating said estimated ratio to develop a current phase; and performing, synchronous to said local clock and during a single local sample period, a number of read operations from said FIFO memory in accordance with an integer portion of said current phase.

10. The method of claim 9, wherein said performing includes:

if said monitored position indicates that said FIFO memory is either approximately empty or full, pre-biasing said estimated ratio to accelerate movement of said monitored position toward a center position between empty and full.

11. The method of claim 9, wherein said performing includes:

if said monitored position indicates that said FIFO memory is neither empty nor full, applying a low-pass filter to said estimated ratio.

12. The method of claim 11, wherein said performing further includes:

biasing said estimated ratio to accelerate movement of said monitored position toward a center between empty and full.

13. In a sampled data system that receives input data samples into a FIFO memory at a source sample rate asynchronous to a local clock, an apparatus for controlling output from said FIFO memory synchronous to said local clock, said apparatus comprising:

a first circuit configured to determine a position of a current read address of said FIFO memory relative to a current write address of said FIFO memory, wherein said read address is advanced in a particular direction upon a read operation from said FIFO memory and said write address is advanced in said particular direction upon a write operation into said FIFO memory;

a second circuit configured to monitor a period between write operations into said FIFO memory; and a third circuit configured to process said monitored period to develop an estimated ratio of a local sample rate to a rate of said write operations, said third circuit configured to perform a particular one of a plurality of sets of operations, wherein each of said plurality of sets of operations corresponds to a respective one of a plurality of tracking modes and said particular set of operations is selected based, in part, on said determined position.

14. The apparatus of claim 13, wherein said plurality of tracking modes includes a first tracking mode having a first response and a second tracking mode having a second response, said first response being faster than said second response.

15. The apparatus of claim 14, wherein said first tracking mode is selected when said monitored position indicates said FIFO memory is approximately full or empty.

16. The apparatus of claim 14, further comprising:

a sixth circuit configured to bias said estimated ratio by a bias amount to accelerate movement of said monitored position toward a center of said FIFO memory between empty and full.

17. The apparatus of claim 15, wherein said third circuit includes a fourth circuit configured to provide a pre-bias to said estimated ratio to accelerate movement of said monitored position toward a center position between full and empty when performing said set of operations corresponding to said first tracking mode.

18. The apparatus of claim 15, wherein said third circuit includes a fifth circuit configured to filter said estimated ratio when performing said set of operations corresponding to said second tracking mode.

19. The apparatus of claim 16, wherein said bias amount is based, in part, on said determined position.

20. The apparatus of claim 18, wherein said fifth circuit is a first order lowpass filter.

21. In a sampled data system that receives input data samples into a FIFO memory at a source sample rate asynchronous to a local clock, an apparatus for controlling output from said FIFO memory synchronous to said local clock, said apparatus comprising:

a first circuit configured to determine a position of a current read address of said FIFO memory relative to a current write address of said FIFO memory, wherein said read address is advanced in a particular direction upon a read operation from said FIFO memory and said write address is advanced in said particular direction upon a write operation into said FIFO memory;

a second circuit configured to monitor a period between write operations into said FIFO memory;

a third circuit configured to process said monitored period to develop an estimated ratio of a local sample rate to a rate of said write operations, said third circuit configured to perform a set of operations depending on said determined position;

a fourth circuit configured to accumulate said estimated ratio to develop a current phase; and a fifth circuit configured to perform, synchronous to said local clock and during a single local sample period, a number of read operations from said FIFO memory in accordance with an integer portion of said current phase.

22. The apparatus of claim 21, wherein said third circuit comprises:

a sixth circuit configured to pre-bias, if said determined position indicates that said FIFO memory is either approximately empty or full, said estimated ratio to accelerate movement of said determined position toward a center position between empty and full.

23. The apparatus of claim 21, wherein said third circuit comprises:

a seventh circuit configured to apply, if said determined position indicates that said FIFO memory is neither empty nor full, a low-pass filter to said estimated ratio.

24. The apparatus of claim 23, wherein said third circuit further comprises:

an eight circuit configured to bias said estimated ratio to accelerate movement of said determined position toward a center between empty and full.

25. For use with a sampled data system that receives input data samples into a FIFO memory at a source sample rate asynchronous to a local clock, a computer program product for controlling output from said FIFO memory synchronous to said local clock, said product comprising:

code that determines a position of a current read address of said FIFO memory relative to a current write address of said FIFO memory, wherein said read address is advanced in a particular direction upon a read operation from said FIFO memory and said write address is advanced in said particular direction upon a write operation into said FIFO memory;

code that monitors a period between write operations into said FIFO memory;

code that processes said monitored period to develop an estimated ratio of a local sample rate to a rate of said write operations, said code that processes performing a particular one of a plurality of sets of operations, wherein each of said plurality of sets of operations corresponds to a respective one of a plurality of tracking modes and said particular set of operations is selected based, in part, on said determined position; and a computer-readable storage medium that stores the codes.

26. The product of claim 25, wherein said plurality of tracking modes includes a first tracking mode having a first response and a second tracking mode having a second response, said first response being faster than said second response.

27. The product of claim 26, wherein said first tracking mode is selected when said monitored position indicates said FIFO memory is approximately full or empty.

28. The method of claim 26, further comprising:

code that biases said estimated ratio by a bias amount to accelerate movement of said monitored position toward a center of said FIFO memory between empty and full.

29. The product of claim 27, further comprising:

code that pre-biases to said estimated ratio to accelerate movement of said monitored position toward a center position between full and empty when performing said set of operations corresponding to said first tracking mode.

30. The product of claim 27, further comprising:

code that filters said estimated ratio when performing said set of operations corresponding to said second tracking mode.

31. The method of claim 28, wherein said bias amount is based, in part, on said monitored position.

32. The product of claim 30, wherein said code that filters implements a first order lowpass filter.

33. For use with a sampled data system that receives input data samples into a FIFO memory at a source sample rate asynchronous to a local clock, a computer program product for controlling output from said FIFO memory synchronous to said local clock, said product comprising:

code that determines a position of a current read address of said FIFO memory relative to a current write address of said FIFO memory, wherein said read address is advanced in a particular direction upon a read operation from said FIFO memory and said write address is advanced in said particular direction upon a write operation into said FIFO memory;

code that monitors a period between write operations into said FIFO memory;

code that processes said monitored period to develop an estimated ratio of a local sample rate to a rate of said write operations, said code that processes performing a set of operations selected depending on said determined position;

code that accumulates said estimated ratio to develop a current phase;

code that performs, synchronous to said local clock and during a single local sample period, a number of read operations from said FIFO memory in accordance with an integer portion of said current phase; and a computer-readable storage medium that stores the codes.

34. The product of claim 33, further comprising:

code that, if said determined position indicates that said FIFO memory is either approximately empty or full, pre-biases said estimated ratio to accelerate movement of said determined position toward a center position between empty and full.

35. The product of claim 33, further comprising:

code that, if said determined position indicates that said FIFO memory is neither empty nor full, applies a low-pass filter to said estimated ratio.

36. The product of claim 35, further comprising:

code that biases said estimated ratio to accelerate movement of said determined position toward a center between empty and full.

* * * * *